United States Patent
Hajiyev et al.

(10) Patent No.: US 11,481,791 B2
(45) Date of Patent: Oct. 25, 2022

(54) METHOD AND APPARATUS FOR IMMEDIATE PREDICTION OF PERFORMANCE OF MEDIA CONTENT

(71) Applicant: REALEYES OÜ, Tallinn Harju (EE)

(72) Inventors: Elnar Hajiyev, London (GB); Martin Salo, London (GB); Javier Orozco, Tallinn Harju (EE)

(73) Assignee: REALEYES OÜ, Tallinn Harju (EE)

(*) Notice: Subject to any disclaimer, the term of this patent is extended or adjusted under 35 U.S.C. 154(b) by 1033 days.

(21) Appl. No.: 15/775,122

(22) PCT Filed: Nov. 17, 2016

(86) PCT No.: PCT/EP2016/077959
§ 371 (c)(1),
(2) Date: May 10, 2018

(87) PCT Pub. No.: WO2017/085168
PCT Pub. Date: May 26, 2017

(65) Prior Publication Data
US 2018/0330249 A1 Nov. 15, 2018

(30) Foreign Application Priority Data
Nov. 19, 2015 (GB) ...................................... 1520398

(51) Int. Cl.
G06Q 30/02 (2012.01)
G06N 5/04 (2006.01)
G06N 20/00 (2019.01)

(52) U.S. Cl.
CPC ........... G06Q 30/0202 (2013.01); G06N 5/04 (2013.01); G06Q 30/0242 (2013.01); G06N 20/00 (2019.01)

(58) Field of Classification Search
CPC ...... G06N 5/04; G06N 20/00; G06Q 30/0242; G06Q 30/0202
See application file for complete search history.

(56) References Cited

U.S. PATENT DOCUMENTS 5,760,382 A * 6/1998 Li ........................... G06F 3/002
235/436
8,381,969 B1 * 2/2013 Miller .................. G06Q 20/382
235/379

(Continued)

FOREIGN PATENT DOCUMENTS

| CN | 103154928 A | 6/2013 |
| CN | 104517157 A | 4/2015 |

(Continued)

*Primary Examiner* — Alexandru Cirnu
(74) *Attorney, Agent, or Firm* — Leason Ellis LLP

(57) ABSTRACT

A computer-implement method of predicting commercial effectiveness of a piece of media content without collecting data from potential consumers. The method comprises extracting an information-rich content-based parameter from the media content. The parameter may be a vector having a predetermined, e.g. fixed, dimensionality that is designed as an input in a performance data prediction engine. By enabling the same type of parameter to be extracted from media content of different types and durations, the technique proposed allows media content for which performance data has already been gathered to be used to predict performance data for new media content. The prediction can be done based on a comparison of the content-based parameters extracted from media content. Alternatively, machine learning techniques may be used to generate a model using known performance data, whereby the model can use the content-based parameter from new media content to predict performance data.

25 Claims, 4 Drawing Sheets

(56) References Cited

U.S. PATENT DOCUMENTS

| | | | | |
|---|---|---|---|---|
| 8,442,849 B2* | 5/2013 | Kantak | ................. | G06Q 30/02 |
| | | | | 705/7.11 |
| 8,959,540 B1* | 2/2015 | Gargi | .................. | H04N 21/237 |
| | | | | 725/9 |
| 9,269,374 B1* | 2/2016 | Conway | ............. | G06K 9/00335 |
| 2008/0249832 A1 | 10/2008 | Richardson et al. | | |
| 2009/0265294 A1* | 10/2009 | Kobayashi | ......... | G06Q 30/0278 |
| | | | | 706/46 |
| 2012/0222057 A1 | 8/2012 | Sadowsky | | |
| 2014/0040019 A1 | 2/2014 | Zheng et al. | | |
| 2014/0278308 A1* | 9/2014 | Liu | ........................ | H04L 67/22 |
| | | | | 703/6 |
| 2015/0206174 A1* | 7/2015 | Barnett | .............. | G06Q 30/0242 |
| | | | | 324/309 |
| 2016/0099854 A1* | 4/2016 | Swaminathan | .. | H04N 21/44213 |
| | | | | 709/224 |

FOREIGN PATENT DOCUMENTS

| | | | | |
|---|---|---|---|---|
| EP | 1921866 A2 * | 5/2008 | ........... | H04N 19/137 |
| JP | 2000163477 A | 6/2000 | | |
| JP | 11161670 A | 2/2004 | | |
| WO | WO 2015/075035 A1 | 5/2015 | | |

* cited by examiner

| Pattern library | | | | |
|---|---|---|---|---|
| Media ID | Feature vector | Performance data | | |
| | | Sales | Emotion | Social media |
| XXX | (0,1,0.2,....0.5,0.1) | — | — | — |
| YYY | (0,1,0.3,....0.4,0.2) | — | — | — |
| YYY | (0,1,0.4,....0.5,0.3) | — | — | |
| BBB | (0,1,0.5,....0.6,0.5) | | | |
| CCC | (0,1,0.6,....0.1,0.7) | | | |

METHOD AND APPARATUS FOR IMMEDIATE PREDICTION OF PERFORMANCE OF MEDIA CONTENT

CROSS-REFERENCE TO RELATED APPLICATIONS

This application is a U.S. National Stage Application under 35 U.S.C. § 371 of International Patent Application No. PCT/EP2016/077959, filed Nov. 17, 2016, which claims priority to Great Britain Application No. 1520398.7, filed Nov. 19, 2015, which are hereby incorporated by reference in their respective entireties.

FIELD OF THE INVENTION

The invention relates to the analysis and processing of media content to determine its impact on end users. For example, embodiments of the invention relate to the prediction of information relating to a computer user's behaviour, e.g., while exposed to media content, to evaluate the effect that media content has on the user, e.g., in comparison with other media content. Embodiments of the invention can relate to the prediction of other relevant performance data, such as sales (e.g. where the media content is an advertisement), social media response (e.g. likelihood of going viral), or likelihood of winning an award (e.g. a Cannes Lions award for advertising). The performance data can reflect differing effects for different types of user.

BACKGROUND TO THE INVENTION

From a commercial viewpoint, it is important to be able to evaluate the performance of content provided online, e.g., an advertisement ("ad"), game, music video, television show, etc. In this regard, it is common to provide a system for computer users to provide feedback by manually rating content, e.g., by selecting a suitable rating value (e.g. a number of stars). It is also similarly common to provide questionnaires or interviews as part of an ad effectiveness tracking scheme.

More recently, techniques for measuring a computer user's emotions, e.g., by facial features tracking or the like, have been incorporated into methods of evaluating the performance of video content. For example, an imaging unit, such as a webcam, can be used to capture images that contain the facial features of a computer user as he or she watches video content. The captured images can be processed to yield information about the computer user's emotions at certain points in the video, which provides valuable feedback as to the performance of the video.

The video and the captured images can be transmitted over the Internet, whereby the feedback can be automatically gathered from a plurality of remote computer users. For example, US 2012/0222057 discusses a system in which a video is embedded in a web-enabled interface that is arranged to collect mental state data for a computer user who watches the embedded video. The web-enabled interface itself can be distributed, e.g., by sending an appropriate URL to a plurality of prospective viewers.

SUMMARY OF THE INVENTION

At its most general, the present invention proposes a technique by which the performance of a piece of media content can be predicted without collecting any data from potential consumers. At its heart, the technique provides a way of extracting an information-rich content-based parameter from any piece of media content from which performance data can be predicted. In an embodiment, this parameter is a vector having a predetermined, e.g. fixed, dimensionality that is designed as an input in a performance data prediction engine. By enabling the same type of parameter to be extracted from media content of different types and durations, the technique proposed herein allows media content for which performance data has already been gathered to be used to predict performance data for new media content in a way that has never been possible heretofore. The prediction can be done based on a comparison of the content-based parameters extracted from media content. Alternatively, machine learning techniques may be used to generate a model from the performance data that has already been gathered, whereby the model can use the content-based parameter from new media content to predict performance data for that media content.

According to one aspect of the invention, there is provided a computer-implemented method of predicting performance data for media content, the method comprising: inputting media content to a first classifier; generating, by the first classifier, a content identifier stream; mapping, by a mapping module, the content identifier stream to a feature vector, wherein the feature vector has a predetermined dimensionality; inputting the feature vector to a prediction engine; and generating, by the prediction engine, predicted performance data for the media content, wherein the prediction engine is arranged to determine a relationship between the feature vector and known performance data for other media content, and wherein the predicted performance data is based on the relationship between the feature vector and the known performance data for the other media content. The method thus provides a technique for reducing an arbitrary dimensionality of the content identifier stream to produce a feature vector having a known reduced dimensionality that is suitable for generating predicted performance data. The method has two stages: the generation of the feature vector for the media content, followed by the use of that feature vector to generator predicted performance data.

The generation of the feature vector uses the classifier as a tool to reduce the dimensionality of the media content whilst still preserving information content that enables useful comparison. The content identifier stream may thus be interpreted as a reduced dimensionality representation of the media content. In practice, the media content may be input to a plurality of classifiers, e.g. in series or parallel, to generate the content identifier stream. Indeed, a plurality of feature vectors having different dimensionalities may be created for the same media content. The prediction engine may require feature vectors of different dimensionality depending on the type of performance data that is to be predicted.

In one example, the content identifier stream produced by the first classifier comprises a numerical representation of subject matter in the media content, and wherein the mapping module maps the numerical representation of the content identifier stream to the feature vector. However, the first classifier may not only analyse the subject matter of the media content, although this is useful in terms of being able to obtain an immediate output. In other example, the first classifier can analyse information derived from the media content or otherwise associated with it. For example, the classifier may analyse behavioural data (e.g. emotional state data) that is available for the media content.

Alternatively, the method may include inputting the content identifier stream from the first classifier to a second classifier, and generating, by the second classifier, a numerical representation of the content identifier stream. In this case, the mapping module may map the numerical representation of the content identifier stream to the feature vector. The invention may include any number of dimension reducing steps similar to those described above to transform the media content into a representation that is suitable for mapping to the feature vector.

The classifiers may be arranged to encode input information into a different format. For example, the first classifier may encode image data into a human-readable or machine-readable format. The second classifier may be arranged to encode human readable data into a machine readable format. The machine readable format may consist of a vector having a plurality of numerical components.

The relationship between the feature vector and the known performance data may take any suitable form. For example, the prediction engine may comprise a model trained using the known performance data for the other media content, which is arranged to receive the feature vector as an input and to provide the predicted performance data as an output. In an embodiment, the model may be based on (i.e. trained using) a plurality of known feature vectors for the other media content, the plurality of known feature vectors each having the same predetermined dimensionality as the feature vector. Thus, the dimensionality of the feature vector is selected to be appropriate to be an input for that model.

The mode may be obtained using a library of feature vectors for which performance data is already known.

Alternatively or additionally, the prediction engine may be arranged to compare the feature vector with a plurality of known feature vectors for other media content, the known feature vectors each having the same predetermined dimensionality, wherein the predicted performance data is based on a result of the comparison. Thus, a prediction of performance data for the new media content can be derived from the known performance data depending on a relationship between the feature vector and the known feature vectors. For example, the step of comparing the feature vector with a plurality of known feature vectors may comprise calculating a correlation between the feature vector and the plurality of known vectors. A distance matrix can be used to calculate a correlation coefficient between the feature vector and the plurality of known feature vectors, as is known in the art.

The method may include selecting the plurality of known feature vectors from a pattern library of known feature vectors. In one example, the plurality of known feature vectors may be all known feature vectors stored in the pattern library. However, in an embodiment, the plurality of known feature vectors may be a subset of the complete pattern library that is tailored for the media content to be analysed. For example, the method may include inputting external criteria relating to the media content, wherein the step of selecting the plurality of known feature vectors is based on the inputted external criteria. The external criteria may relate to any attribute of the media content. In an embodiment, the media content may be an ad, and the external criteria can include any one or more of an identification of a target audience for the ad, and an identification of a market for the ad.

The pattern library may comprises multiple feature vectors for a given piece of previously analysed media content. For example, users used for testing performance of media content can be segmented into several user groups and for each user group a separate feature vector can be computed for a single piece of media content. In other words, collected performance data for each media content can be further segmented, allowing calculation of multiple feature vectors. In additional to the feature vectors that are based on segmented collected performance data, it is also possible to have a single feature vector based on all the collected performance data for that piece of media content. This single feature vector may thus represent the full richness of performance data that is captured for that piece of media content.

When it comes to generating the predicted performance data, the method can include selecting a subset of the plurality of known feature vectors which most closely correlate with the feature vector, wherein the known performance data used in the step of generating the predicted performance data is associated with the subset of the plurality of known feature vectors. In other words, the method may filter the known performance data based on a correlation between the feature vector and the plurality of known feature vectors. The pattern library may comprise hundreds or thousands of known feature vectors. The subset of the plurality of known feature vectors may comprise fewer than twenty feature vectors, e.g. ten.

The mapping step referred to herein may be expressed generally as a step of projecting the content identifier stream into a reduced dimensionality feature space. The feature vectors referred to herein can be vectors in such a reduced dimensionality feature space.

The feature space may have a predetermined, e.g. fixed, dimensionality. The feature space may be generated based on dimensionality reduction model obtained by applying machine learning techniques to training set of numerical representations of the type discussed above. For example, a dimensionality reduction model can be obtained by applying a training set of numerical representations to a clustering algorithm. In other example, the dimensionality reduction model may include or consist of manually determined rules. The training set of numerical representations can be numerical representation extracted by the first and second classifiers from the other media content, i.e. the media content for which performance data is known. The step of mapping may comprise mapping the numerical representation of the content identifier stream into a feature space as defined above. The feature space may have a large number of dimensions, e.g. up to 80,000.

As mentioned above, feature vectors having different dimensionalities may be obtained from the same media content. The method may include selecting a reduced dimensionality for the feature vector and projecting the content identifier stream into a reduced dimensionality feature space having the selected reduced dimensionality. There may be a plurality of levels of dimensionality depending on the level of extraction required by the prediction engine. In an embodiment, the mapping step may be arranged to output a feature vector having 80,000 or 10,000 or 500 or 20 dimensions.

In one embodiment, the generation of the feature vector can be a two stage process. Firstly, an analysis (preferably an automated analysis) of the media content is performed. Secondly, the result of the content analysis is transformed into a machine readable format which is capable of being mapped to the feature vector. In other embodiments, the content analysis may immediately yield a machine readable output that is capable of being mapped to the feature vector. As explained above, the analysis step may utilise multiple classifiers.

The first stage may use any known algorithms capable of complex content analysis, e.g. the Clarify API provided by Clarify, Inc., or the Image Tagging API from AlchemyAPI, Inc., or one or more APIs from Microsoft Corporation's Project Oxford. Such algorithms or APIs typically generate an output that can include elements that are understandable by humans, e.g. words, as well as elements indicative of other lower-level features, such as brightness level, scene changes, colour scheme, etc. The content identifier stream can be in a human readable format. For example, the content identifier stream may comprise a plurality of words. Where the media content comprises a plurality of image frames (e.g. is a video or the like), the first classifier can be arranged to output a predetermined number of words per image frame.

In embodiments that require a separate step of transforming the content identifier stream into a format suitable for mapping to the feature vector, the second stage may use any known algorithms capable of encoding human readable data into a machine readable format. The machine readable format may consists of a vector having a plurality of numerical components. The size of the vector may vary depending on the size and/or nature of the content identifier stream. For this reason, outputs of the second stage are not readily comparable unless the inputs (i.e. content identifier streams) have an identical format. The invention overcomes this problem by mapping these outputs into a common format.

As mentioned above, the first and second stages discussed above may be combined, i.e. the first and second classifier may be embodied in a single classifier that is arranged to output a numerical representation of content in the media under test.

The known performance data is preferably of the same type as the predicted performance data. The predicted performance data can be determined from the known performance data using any suitable technique.

As discussed above, the known performance data can be used to generate a model that receives the feature vector as its input and produces predicted performance data as its output. The model can be generated using any known machine learning technique.

Alternatively or additionally, the known performance data may be combined using conventional statistical methods to yield the predicted performance data. For example, the predicted performance data may be an average of the known performance data from the subset of known performance data discussed above. The average may be weighted based on a correlation coefficient between the feature vector and the known feature vectors in the subset. Alternatively or additionally, the predicted performance data may comprise a range of values extracted from the known performance data, the range having one or both of an upper boundary (maximum) and lower boundary (minimum).

The performance data may be any quantifiable parameter associated with a piece of media content. For example, the predicted performance data is any one of likely behavioural data for a consumer (in particular emotional state information for the consumer), social media response data, likelihood of winning an award, questionnaire response data, and sales impact information. In an embodiment, the predicted performance data can be emotional state data indicative of one or more emotional responses of a notional user in response to the media content. The one or more emotional responses can comprise any emotional state parameter that may be of use. For example, the emotional state parameter may include a metric for each of six universal emotions, e.g. happiness, sadness, surprise, fear, disgust and anger. The analysis may also generate one or more further metrics that may be independent of the emotions or based on other combinations of facial feature movement. For example, the further metrics may include engagement, attentiveness, boredom, confusion, neutrality, valence and arousal. Behavioural data may also include measures like heart rate which can be read visually by slight changes of skin colour. The emotions for which data is collected can comprise angry, disgusted, neutral, sad, scared, happy, surprised and their derivatives. Other behavioural information (e.g. physical data such as head orientation or upper body posture) may also be collected. For example, the approach or withdrawal of a user (i.e. leaning forwards or backwards relative to the display) may be collected. This information can be combined with other information, e.g., emotional state information, to derive further indicators of a computer user's reaction, e.g., engagement, etc. As indicated above, behavioural data can comprise the emotions detected from facial expressions of computer users as they view media content. Additionally or alternatively, the behavioural data may include, but is not limited to, other information that can be collected from a user that interacts with media content, e.g., any of gestures, blood pressure (e.g. based on skin colour or a monitoring accessory), blinking, etc.

In an embodiment, the predicted performance data may be tailored to reflect a particular consumer or group of consumers to which the media content may be targeted. For example, the known performance data may comprise aggregated emotional response data for a plurality of different notional user types, each notional user type having a distinct emotional profile. The method can include inputting to the prediction engine a user type for which predicted performance data is desired.

The method can be embodied as computer readable instructions (i.e. program code) stored on a computer readable storage medium, which when executed by a computing device causes the computing device to perform a method of predicting performance data for media content described above.

The method above may be implemented on a networked computer system. For example, the classifiers and prediction engine may be arranged in a server to receive requests from remote customer devices (e.g. from media content providers) who wish to obtain predictions about the performance of their material. In another aspect of the invention, there is provided a system for predicting performance data for media content, the system comprising: a prediction server arranged to receive media content for analysis from a media content provider, the prediction server comprising: a first classifier for generating a content identifier stream from the received media content; a mapping module for mapping the content identifier stream to a feature vector having a predetermined dimensionality; and a prediction engine for generating predicted performance data using the feature vector; and a pattern library communicatively coupled to the prediction server, the pattern library storing performance data entries for a plurality of other media content, wherein the prediction engine is configured to: determine a relationship between the feature vector and known performance data for other media content, and generate the predicted performance data based on the relationship between the feature vector and the known performance data for the other media content.

Each performance data entry may comprise a feature vector and performance data for the other media content, and each feature vector having the predetermined dimensionality, and wherein the prediction engine is configured to: compare the feature vector with the feature vectors for the other media content; and generate the predicted performance data based on a result of the comparison and on performance data for the other media content.

As discussed above, there may be a plurality of feature vectors for each piece of media content in the pattern library. Each feature vector may have a different dimensionality and/or may be based on a subset of the performance data collected for that piece of media content.

The system may include one or more remote customer devices (e.g. media content providers) that are communicably connected to the prediction server to input media content for analysis. Herein a customer device may mean any computing device, e.g. network-enabled computing device, that is arranged to input media content to the prediction server and/or receive the predicted performance data for that media content.

The system may further include one or more performance data collection devices for inputting performance data to be stored in the pattern library. The performance data collection devices may be any computing device, e.g. network-enabled computing device, that is arranged to transmit collected performance data to the prediction server or pattern library. In an embodiment, the performance data collection devices can include user devices (e.g. PCs, laptops, tablets, smartphones, etc.) that are arranged to playback media content and collect behavioural data for a user consuming that media content.

The ability of the invention to provide an immediate prediction of performance data for a piece of media content. Use of such qualitative comparisons allows content producers, distributors, network operators and similar entities to limit transmission of media content since it is no longer necessary to obtain feedback from consumers prior to official release. Network and computational resources may therefore be conserved. Moreover, the time necessary to obtain qualitative comparison is instant as opposed to when testing with real users is required. There is therefore also a cost saving on human resources that are required in other content evaluation approaches.

Herein, the term "behavioural data" is used to mean any data concerning the activity or status of the user. It may include emotion state data, i.e. information indicative of the user's emotion at any given time. Emotion state data may be obtained in any way, e.g. from facial images or other physiological indicators obtained via a webcam. Behavioural data may also include data concerning the user's interaction with the computer, e.g. audio data, click data or other data indicative of the user's interest in a portion of the display. In addition to behavioural data, the invention may also provide for the collection and transmission of other user data, e.g. indicative of other details about the user, such as gender, age, location, etc.

BRIEF DESCRIPTION OF THE DRAWINGS

Embodiments of the invention are described below in detail with reference to the accompanying drawings, in which.

DETAILED DESCRIPTION; FURTHER OPTIONS AND PREFERENCES

The present invention provides a technique for enabling performance data for a piece of media content to be predicted based on the content itself rather than on some external measured reaction to that content. This is advantageous as it can allow immediate evaluation of media content without requiring a time-consuming and possible more costly stage of collecting feedback. In general, the technique of the invention is based on a two stage mapping process that transforms the media content into a vector representation in a feature space having a predetermined dimensionality. By mapping media content of all types (e.g. video, audio, etc.) and duration into the same feature space, a meaningful comparison can be made between them, e.g. by determining a level of correlation between vectors belonging to different media content. Underpinning the process is a pattern library, which is built using media content for which performance data (e.g. collected behavioural data, sales data, social media response statistics, likelihood of winning an award, questionnaire response data, etc.) is available (e.g. has previously been collected) and is associated with a vector representation in the feature space.

Figure 1:
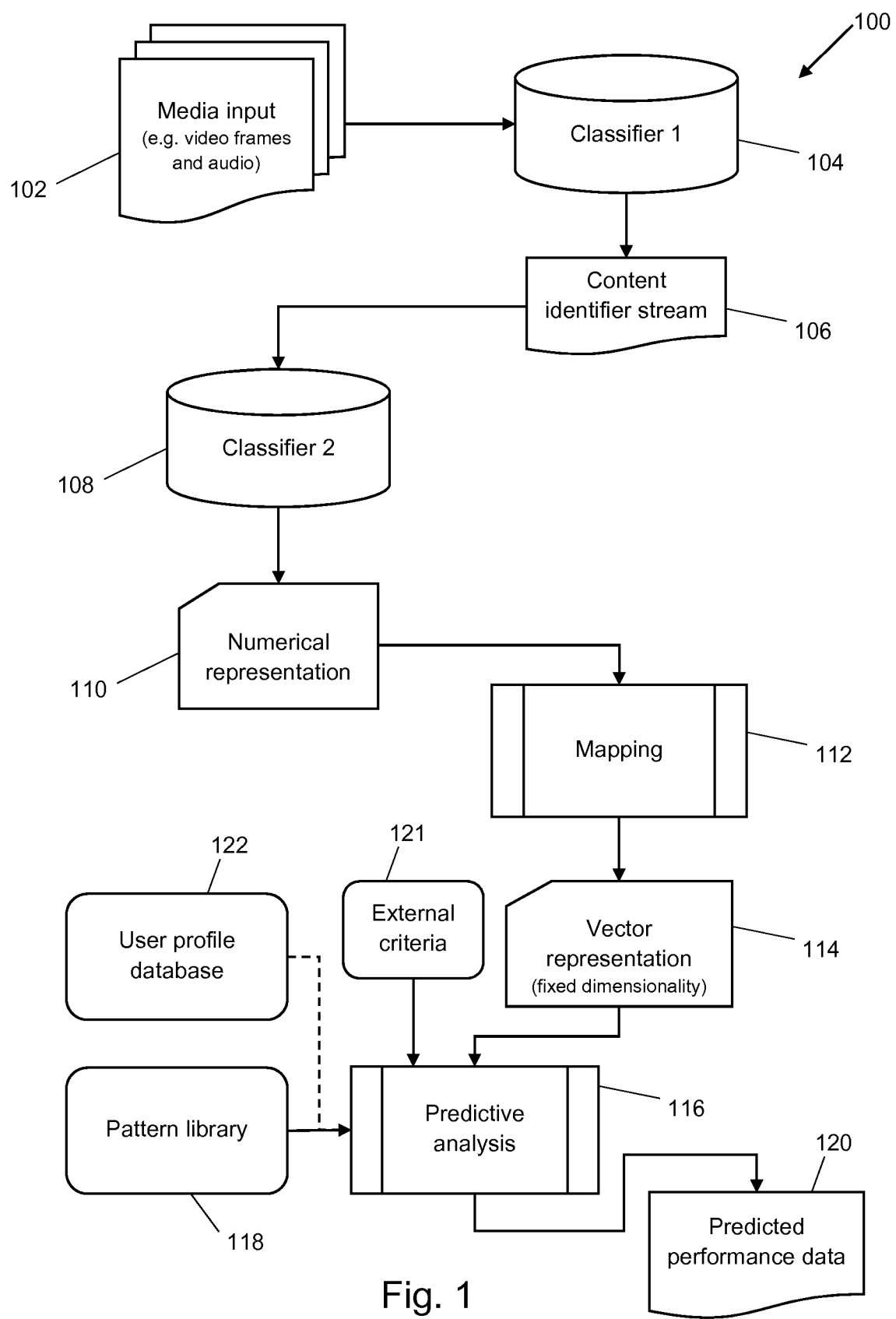
FIG. 1 is a schematic flow depicting steps in a method of predicting performance data for media content that is an embodiment of the invention.

FIG. 1 is a schematic flow depicting steps in a method 100 of predicting performance data for a piece of media content. The method 100 being with a step of receiving a piece of media content 102. The media content may be a video (e.g. a plurality or sequence of image frames). The video may include accompanying audio. The media content may be audio alone. The media content is input to a first classifier 104 that is arranged to analyse the media content and output a content identifier stream 106. In an embodiment, the content identifier stream comprises a plurality of keywords or key phrases that relate to what is shown or heard in the media content. For example, the classifying API provided by Clarify, Inc. may be used to generate a stream of content identifiers. In one embodiment, the content identifiers comprise a set of keywords, e.g. 20 keywords, for each frame of a video. The keywords may relate to objects or action shown in the video, e.g. "dog" "chasing" "cat", or to sounds hear on accompanying audio, e.g. "train" "passing", or to editorial or cinematographic information related to the video, e.g. "close-up", "blurred background", frequency of scene changes, speed of motion, dark vs light scenes, frequency of colour changes, colour spectrum, frequency of certain object's appearance, and information about their temporal character, e.g. speed, duration, etc.

The content identifier stream 106 may be human readable. Depending on the classifier used and the duration of the media content, the content identifier stream will have a different size for different pieces of media content.

The method continues by inputting the content identifier stream to a second classifier 108. The second classifier 108 is arranged to transform the content identifier stream into a machine readable form, i.e. a numerical representation 110. The numerical representation 110 may be a vector, e.g.

obtained by applying the content identifier stream to a known neural net algorithm for computing vector representations, such as the open source word2vec code.

Similarly to the content identifier stream 106 from which it is derived, the numerical representation 110 will have a different size depending on the duration of the media content 102 and the type of classifier 104 used to generate the content identifier stream. For this reason it is different to compare numerical representations from different media content with each other. However, the invention solves this problem by inputting the numerical representation to a mapping algorithm 112 that maps it to a vector representation 114 in a fixed dimensionality feature space. The dimensions of the feature space may be determined using a clustering algorithm, e.g. with a plurality of numerical representations from a variety of media content.

The vector representation 114 has the same dimensionality for all media content, and therefore allows direct comparison therebetween. The method continues by inputting the vector representation to a predictive analysis module 116. The predictive analysis module 116 is arranged to compare the input vector representation with a set of stored vector representations (also referred to herein as "feature vectors") in a pattern library 118 in order to output predicted performance data 120 for the media content 102. An example of how the comparison can be performed is discussed below with reference to FIG. 3.

The predicted performance data may take any one of a variety of forms. In an embodiment, the predicted performance data may indicate one of more predicted sales parameters, e.g. a rating regarding expected revenue or a rating indicative of expected customer feedback. In another embodiment, the predicted performance data may indicate one or more social media response parameters, e.g. a rating regarding expected likes or shares, or a probability rating for going viral. In another embodiment, where the media content is an advertisement, the predicted performance data may indicate a probability rating for an award in a competition, e.g. a predicted probability of winning "gold", "silver" or "bronze".

In another embodiment, the predicted performance data may comprise a predicted behavioural response, e.g. a likely emotional response of a user consuming the media content. The predicted behavioural response may be generic, e.g. an average across all users. Alternatively it may be tailored by user type, i.e. the predicted behavioural response may vary according to a user's profile. In this example, a user profile database 122 may store a behavioural profile for one or more users. The predictive analysis module 116 may be notified of the user (or user profile type) for which the prediction is to be made, and tailor the prediction accordingly.

Figures 2, 3:
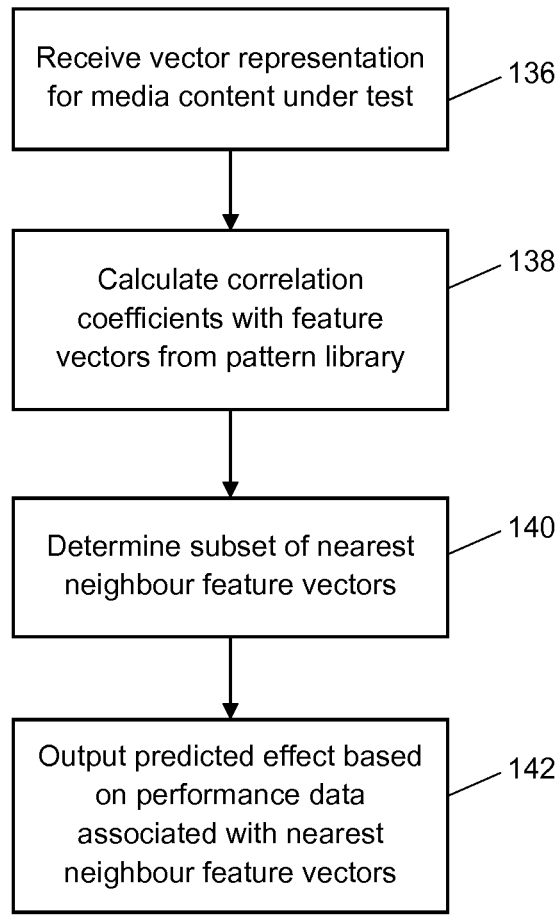
FIG. 2 is a schematic representation of a pattern library that can be used in the invention.
FIG. 3 is a flow chart depicting a steps in vector representation comparison that can be used to predict performance data in embodiments of the invention.

FIG. 2 shows a schematic representation of the content of the pattern library 118. The pattern library contains a plurality of entries, each entry being for a respective piece of media content for which both a feature vector has been obtained and for which some performance data is known. Each entry may have a unique media ID value 124 that is stored in associated with a respective feature vector 126. In this example, each feature vector 126 is associated with performance data 128 in any one of the categories "sales" 130, "emotion" 132 and "social media" 134. Each entry does not need to have performance data in each category. Furthermore, each category may be sub-divided. For example, the "emotion" category 132 may have multiple entries for each media content (e.g. as shown for media ID YYY) to reflect emotional response data recorded for a plurality of different user profile types.

More generally, the technique described above may be used to evaluate the impact of media content on a certain (e.g. targeted) group of people. The invention is not limited to obtaining predicted performance data for a general population. It is therefore desirable for the predicted effect to be tailored on the group for which it was intended. This can be done by inputting external criteria to filter the plurality of known feature vectors from the pattern library that are used to provide the known performance data from which the predicted performance data is generated. In FIG. 1 the prediction analysis 116 may include an additional input of external criteria 121 that is used to select the known feature vectors (and therefore the known performance data) on which the analysis is to be performed.

The external criteria may take any suitable form. For example, the external criteria may comprises additional information describing the population segment for which prediction is to be calculated. Example may include prediction of performance for certain demographic group, e.g. women, or prediction of performance for certain geographical regions, e.g. USA or Brazil. In another example, the external criteria may specify a certain population segment or a fixed set of population segments (general population, men, women, age groups, locations) for which predicted performance data is wanted. In yet another example, the external criteria may specify a certain time period for the known performance data, e.g. the external criteria may specify that the known feature vectors used for prediction are no older than 1 month, or may specify that the known feature vectors used for prediction are 10 years old.

FIG. 3 is a flow chart illustrating one example of a method of computing the output predicted performance data. The method begins in the predictive analysis module 116 by receiving 136 the computer vector representation (i.e. feature vector) for a piece of media under test. The method continues with a step 138 of comparing the received feature vector with a plurality of feature vectors from the pattern library 118 by calculating a correlation coefficient for each of the plurality of feature vectors with the received feature vector. This calculating may be performed by using a distance matrix method to determine which of the plurality of feature vectors is closest to the received feature vector.

The method continues with a step 140 of determining a subset of nearest neighbour feature vectors based on the calculated correlation coefficients. After the subset of nearest neighbour feature vectors are identified, their performance data can be read from the pattern library. The method continues with a step of outputting a predicted effect that is based on the performance data read for the subset of nearest neighbour feature vectors. For example, the predicted effect may be obtained by taking an average of the performance data parameters from the subset of nearest neighbour feature vectors.

One aspect of the feature vectors described above is that they can encode information about temporal characteristics of the media content. For example, the content identifier stream will indicate when objects are repeatedly visible or shown in conjunction with other items. Where appropriate, it may be beneficial the performance data stored in the pattern library to be indicative of temporal characteristics. In particular, where emotional data is recorded, it may be useful to associate that data with particular segments of the media.

Figure 4:
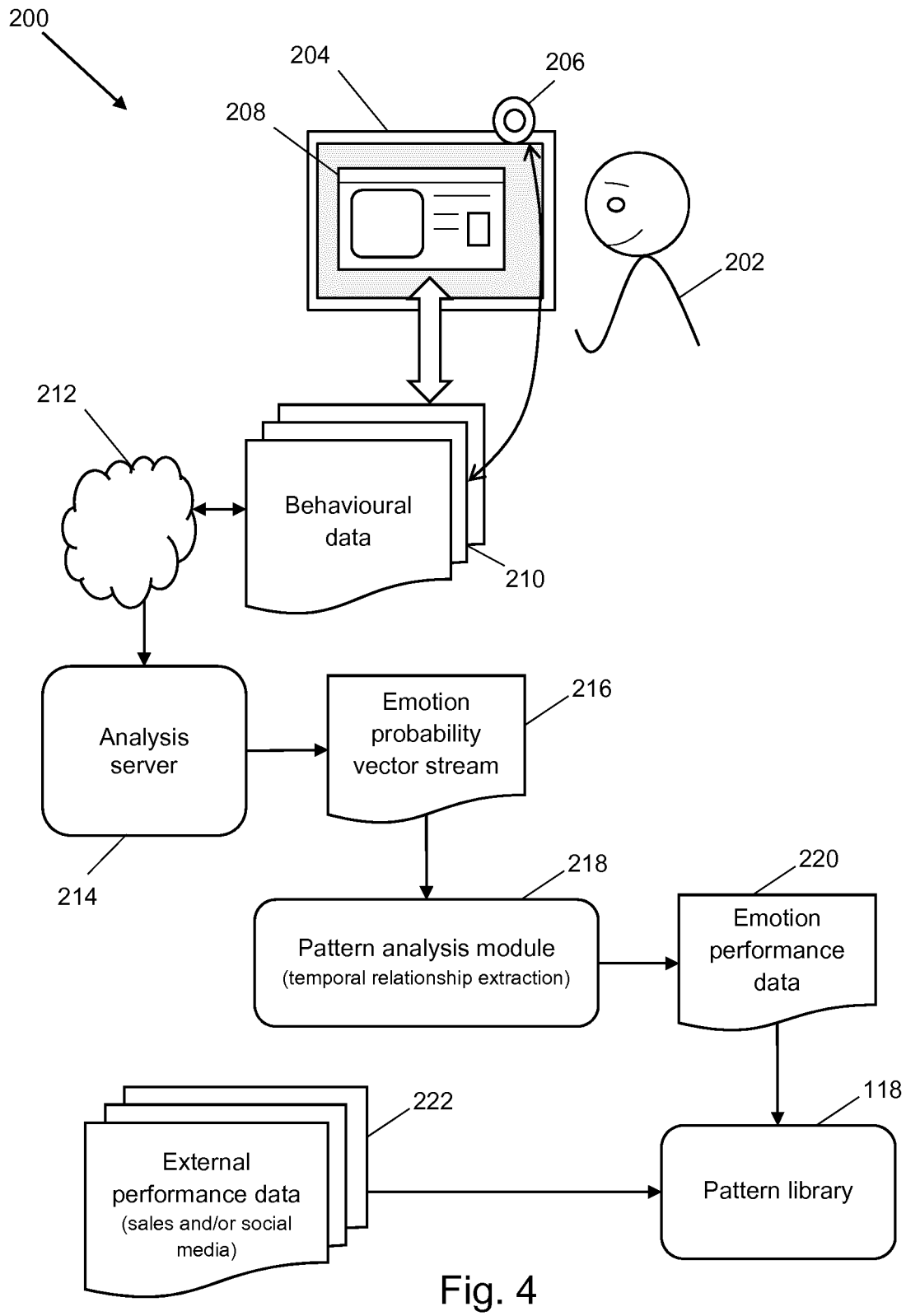
FIG. 4 is a schematic flow depicting steps in a method of generating entries for the pattern library that is used in embodiments of the invention.

FIG. 4 is a schematic flow that illustrates a method 200 of recording behavioural (preferably emotional state) data that can be related to a temporal characteristic of the media content. This is an example of one type of performance data that can be used with the invention. However, it should be noted that the invention is not limited to this type of performance data. In an embodiment where the media content to be analysed is an ad, it may be desirable for the predicted performance data to be indicative of impact on sales, since this is likely a key performance indicator. In this example, other types of performance data can be predicted, but they may represent intermediate positions in a process of deriving predicted sales.

For example, in a setting where it is necessary to predict sales for a video, for which only emotion state data is available, the invention may include a classifier and mapping module that are arranged to compute a feature vector from the emotional state data. This feature vector may then be used to find similar feature vectors in the pattern library, from which known sales data can be used to predict sales data for the video.

In another example, analysis of the media content may yield a plurality of scene tags that are used to build a feature vector. This feature vector can be compared with known feature vectors which have a known emotional response (but no sales data) associated with them in order to obtain an intermediate predicted emotional response for the media content. This intermediate predicted emotional response can in turn be used to generate a new feature vector in line with the process described above, which may be used to find similar feature vectors for which sales data is known in order to predict sales for the media content.

The method 200 begins with a user 202 viewing media content on a display 204 associated with a network-enabled computing device (not shown). The display 204 may be associated with any network enabled display device. For example, the display 204 may be provided by or connected to a network-enabled television, a set-top box, a gaming console, a PC, a laptop computer, a tablet computer or a smartphone. The computing device is thus capable of sending and receiving data over a network, such as the Internet. The media may be displayed via a web browser or video player 208, such as e.g. Windows Media Player, QuickTime Player, Audacious, Amarok, Banshee, MPlayer, Rhythmbox, SMPlayer, Totem, VLC, and xine, or an online video player, such as JW Player, Flowplayer and Brightcove.

The computing device or display 204 is connected to or has inbuilt means for recording behavioural data, such as a microphone, a webcam 206, etc.

The computing device has a behavioural data collection application associated with it, e.g. stored in memory thereon or downloadable or accessible via a network. In practice, the user 202 may receive on the computing device an invitation to participate in a behavioural data collection exercise, e.g. whilst viewing media content on the media player 208. Upon execution, the behavioural data collection application may communicate with a remote analysis server 214 via a network 212 to collect and deliver behavioural data 210.

The behavioural data collection application may be an emotion tracking application for collecting information indicative of the user's emotional state. The data collection application may also be arranged to collect other types of behavioural data. The collected behavioural data may allow the user's emotions to be tracked during the user's interaction with media played back on the video player 208.

The behavioural data collection application may execute or control an initialisation process which sets up communication between the analysis server 214 and the means for recording behavioural data (e.g. webcam 206) to enable collected data 210 (e.g. webcam images, behavioural data, media attributes, etc.) to be transferred therebetween. For example, the initialisation process may comprises setting up (e.g. obtaining authorisation for) communication across the network 212. The collected data 210 may thus be sent over the network to the analysis server 214, where information about the user's emotions can be extracted and used for further processing.

In an embodiment, the collected behavioural data 210 may comprise a webcam recording consisting of a plurality of image frames and an audio track. The collected data also includes a media identifier so it is known what media content is associated with the collected data. The media content and webcam recording can be synchronised using known techniques. This enables each image frame of the webcam recording to be associated with a corresponding part of the media content.

The analysis server 214 is arranged to extract emotional state information from the image frames on a frame-by-frame basis. This may be done in any known manner. For example, the analysis may include detecting for the presence of a face in the image frame, identifying key facial features (e.g. corners of eyes, mouth position, etc.), and monitoring the relative position of the key facial features through the duration of the media content.

The method continues with a step of outputting an emotion probability vector stream 216 from the analysis server 214. The emotion probability vector stream 216 is a set of vectors corresponding to a plurality of (or all of) the image frames in the webcam recording. Each vector consists of a plurality of components, each of which represents a probability that its respective image frame contains a face expressing a given emotion. The probabilities are calculated by the analysis server 214 in a conventional way.

In some examples, the emotion probability vector stream 216 may be used directly to generate a display, e.g. to show how emotions vary during the duration of the media content. However, in this example, the emotion probability vector stream is input to a pattern analysis module 218 that is arranged to determine deeper patterns with the emotional state data. In particular, the pattern analysis module may look at temporal characteristics of the emotional probability vector stream. The temporal characteristics may be predetermined. For example, the presence of "happiness immediately before surprise", "smile in first 3 seconds of media content", or "surprise after seeing a brand" represent characteristics of the emotional state data that depend on the temporal relationship between different emotions or between detected emotions and the stage of the media content. In another example, the media content may be divided into segments (e.g. quarters by duration, or "first 10 seconds", or "last 5 seconds"). Predetermined temporal relationships between emotions may be determined for each segment.

The predetermined temporal characteristics may be selected to correspond to desirable or undesirable characteristics for a piece of media content. In some embodiments, the temporal characteristics may be determined by machine learning techniques.

The method continues with a step of outputting from the pattern analysis module 218 emotion performance data 220 which can be stored in association with the media content in the pattern library. The media content may be assessed according to the process discussed above with respect to FIG. 1 so that the pattern library also contains a feature vector for the media content.

The emotion performance data 220 may include additional information about the user, such a user emotional profile. This can provide more granularity to the emotional performance data held in the pattern library 118.

As discussed above, the pattern library may also contain other external performance data 222 associated with a piece of media content. The external performance data 222 may be information concerns sales, social media response, competition success, etc., as described above.

Although the discussion with respect to FIG. 4 concerns a single view of a single piece of media content, it can be appreciated that the emotional performance data in the pattern library is intended to be based on a large number of pieces of media content, each of which have emotional performance data recorded from a large number of users. The emotional performance data 220 for each piece of media content in the pattern library 118 can therefore be understood to correspond to aggregated performance data for multiple users.

Figure 5:
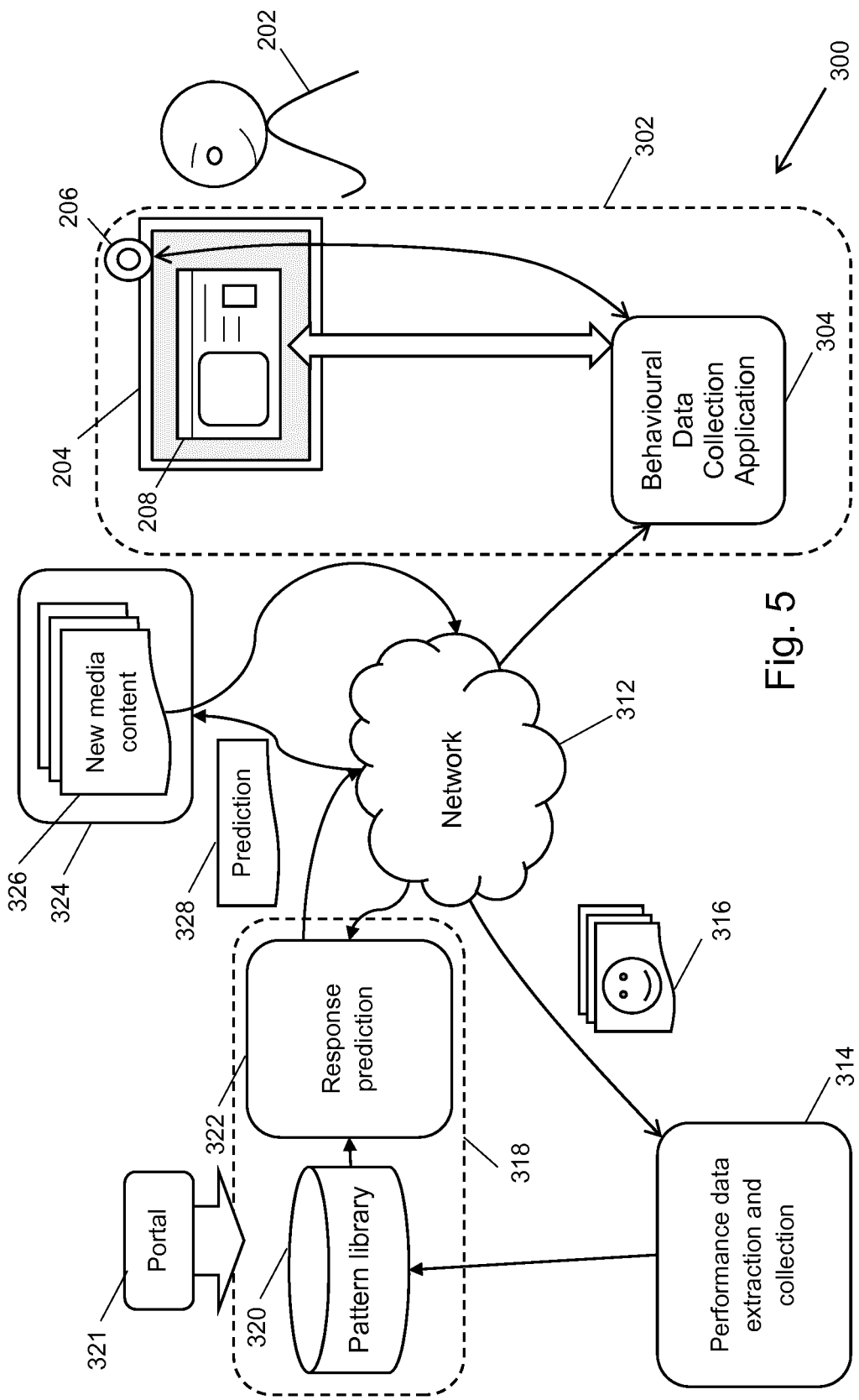
FIG. 5 is a schematic diagram showing a networked computer system in which embodiments of the invention can be implemented.

FIG. 5 is a schematic diagram of a system 300 that can be used to implement the invention. The heart of the system is a prediction server 318. The prediction server 318 can receive a request from a media content provider 324 (e.g. advertiser, film marker, etc.) to provide a prediction 328 of performance data for new media content 326. The request may be delivered over a network 312 (e.g. the Internet) or in any other suitable manner. For example, the request may be via a delivery website or portal 321, at which a customer can upload a piece of media content to obtain the results of instant prediction.

In this example, the prediction server 318 contains a response prediction engine 322 (e.g. arranged to perform the process described above with reference to FIG. 1) and a pattern library 320 (which performs the same functions as the pattern library discussed above). However, in some embodiments the pattern library may be located remotely from the prediction server 318.

The system also includes a performance data extraction and collection server 314. In this example, this is shown as a separate device from the prediction server 318, although this is not essential (i.e. they may be combined). The performance data extraction and collection server 314 may have a user interface (not shown), such as a web portal or the like, that allows manual input of external performance data (e.g. sales or social media response data) for pieces of media content. The performance data extraction and collection server 314 is also arranged to receive behavioural data (e.g. a raw webcam recording comprising a plurality of image frames 316) via the network 312 from a client (user) device 302. The client device may be any suitable network enabled device for running a behavioural data collection application 304. The client device 302 and performance data extraction and collection server 314 in combination perform the process discussed above with respect to FIG. 4 in order to populate the pattern library 320. Features in common with FIG. 4 are given the same reference number and are not described again.

Although FIG. 5 shows only a single media content provider 324 and a single client device 302 it can be appreciated that the performance data extraction and collection server 314 and the prediction server 318 are intended to operate with a plurality of client devices and media content providers respectively.

The invention claimed is:

1. A computer-implemented method of predicting performance data for media content, the method comprising:
   inputting the media content to a first classifier;
   generating, by the first classifier, a content identifier stream that is representative of what is shown or heard in the media content across its entire duration;
   mapping, by a mapping module, the content identifier stream to a feature vector, wherein the step of mapping the content identifier stream includes projecting the content identifier stream into a reduced dimensionality feature space, and wherein the feature vector has a predetermined dimensionality;
   inputting the feature vector to a prediction engine, wherein the prediction engine is arranged to determine a relationship between the feature vector and known performance data for other media content; and
   generating, by the prediction engine, predicted performance data for the media content that uses a model trained on the basis of a plurality of known feature vectors for the other media content; and
   outputting the predicted performance data,
   wherein the prediction engine is further arranged to receive the feature vector as an input to the model and provide the predicted performance data as an output,
   wherein the predicted performance data is based on the relationship between the feature vector and the known performance data for the other media content,
   wherein the prediction engine uses the plurality of known feature vectors for the other media content to determine the relationship between the feature vector and the known performance data, and
   wherein the known feature vectors each have the same predetermined dimensionality as the feature vector.

2. A method according to claim 1, wherein the prediction engine is arranged to compare the feature vector with the plurality of known feature vectors for other media content, wherein the predicted performance data is based on a result of the comparison.

3. A method according to claim 2, wherein the step of comparing the feature vector with a plurality of known feature vectors comprises calculating a correlation between the feature vector and the plurality of known vectors.

4. A method according to claim 3, wherein a distance matrix is used to calculate a correlation coefficient between the feature vector and the plurality of known feature vectors.

5. A method according to claim 3, further comprising selecting a subset of the plurality of known feature vectors which most closely correlate with the feature vector, wherein the known performance data used in the step of generating the predicted performance data is associated with the subset of the plurality of known feature vectors.

6. A method according to claim 5, wherein the subset of the plurality of known feature vectors comprises ten or more known feature vectors.

7. A method according to claim 1, wherein the content identifier stream comprises a numerical representation of subject matter in the media content, and wherein the mapping module maps the numerical representation of the content identifier stream to the feature vector.

8. A method according to claim 1, further comprising:
   inputting the content identifier stream to a second classifier; and
   generating, by the second classifier, a numerical representation of the content identifier stream,
   wherein the mapping module maps the numerical representation of the content identifier stream to the feature vector.

9. A method according to claim 8, wherein the second classifier is arranged to encode human readable data into a machine readable format.

10. A method according to claim 9, wherein the machine readable format consists of a vector having a plurality of numerical components.

11. A method according to claim 1, further comprising:
inputting criteria relating to the media content; and
selecting, based on the input criteria, the plurality of known feature vectors from a pattern library of known feature vectors.

12. A method according to claim 11, wherein the media content is an ad, and the input criteria includes any one or more of an identification of a target audience for the ad, and an identification of a market for the ad.

13. A method according to claim 1, wherein the projecting is based on a dimensionality reduction model obtained by applying machine learning to training set of numerical representations.

14. A method according to claim 1, wherein the step of mapping includes selecting a reduced dimensionality for the feature vector and projecting the content identifier stream into the reduced dimensionality feature space having the selected reduced dimensionality.

15. A method according to claim 1, wherein the content identifier stream is in a human readable or a machine readable format.

16. A method according to claim 15, wherein the content identifier stream comprises a plurality of words.

17. A method according to claim 15, wherein the media content comprises a plurality of image frames, and wherein the first classifier is arranged to output a predetermined number of words per image frame.

18. A method according to claim 1, wherein the known performance data is of the same type as the predicted performance data.

19. A method according to claim 1, wherein the predicted performance data is any one of emotional state information, social media response data, likelihood of winning an award, questionnaire response data, and sales information.

20. A method according to claim 19, wherein the predicted performance data is emotional state data indicative of one or more emotional responses of a notional user in response to the media content.

21. A method according to claim 20, wherein the known performance data comprises aggregated emotional response data for a plurality of different notional user types, each notional user type, and wherein the method further includes inputting to the prediction engine a user type for which predicted performance data is desired.

22. A computer program product comprising a non-transitory computer readable storage medium having stored thereon computer program code, which when executed by a computing device causes the computing device to perform the method of predicting performance data for media content according to claim 1.

23. A system for predicting performance data for media content, the system comprising:
a prediction server arranged to receive the media content for analysis from a media content provider, the prediction server comprising:
a first classifier for generating a content identifier stream that is representative of what is shown or heard in the received media content across its entire duration;
a mapping module for mapping the content identifier stream to a feature vector having a predetermined dimensionality by projecting the content identifier stream into a reduced dimensionality feature space; and
a prediction engine for generating and outputting predicted performance data using the feature vector through use of a model trained using a plurality of known feature vectors for a plurality of other media content; and
a pattern library communicatively coupled to the prediction server, the pattern library storing the plurality of known feature vectors and performance data entries for the other media content,
wherein the prediction engine is configured to:
use the plurality of known feature vectors from the pattern library to determine a relationship between the feature vector and known performance data for the other media content, and
generate the predicted performance data based on the relationship between the feature vector and the known performance data for the other media content by use of the model that receives the feature vector as an input to the model and provides the predicted performance data as an output, and
wherein the known feature vectors each have the same predetermined dimensionality as the feature vector.

24. A system according to claim 23, wherein each performance data entry comprises a feature vector and performance data for the other media content, and each feature vector having the predetermined dimensionality, and wherein the prediction engine is configured to:
compare the feature vector with the feature vectors for the other media content; and
generate the predicted performance data based on a result of the comparison and on performance data for the other media content.

25. A system according to claim 23, wherein the prediction server comprises a second classifier for generating a numerical representation of the content identifier stream, and wherein the mapping module is arranged to map the numerical representation of the content identifier stream to the feature vector.

* * * * *